Dec. 28, 1943.  C. H. GEMBERLING ET AL  2,338,034
POTATO PLANTER
Filed April 17, 1940  8 Sheets-Sheet 1

Fig. 1.

Inventors:
Cameron H. Gemberling,
Rudolph J. Altgelt,
BY John P. Smith
ATTORNEY.

Dec. 28, 1943. C. H. GEMBERLING ET AL 2,338,034
POTATO PLANTER
Filed April 17, 1940 8 Sheets-Sheet 2

Inventors:
Cameron H. Gemberling
Rudolph J. Altgelt
BY John P. Smith ATTORNEY.

Dec. 28, 1943.  C. H. GEMBERLING ET AL  2,338,034
POTATO PLANTER
Filed April 17, 1940  8 Sheets-Sheet 4

Inventors:
Cameron H. Gemberling
Rudolph J. Altgelt,
BY
John P. Smith
ATTORNEY.

Dec. 28, 1943. C. H. GEMBERLING ET AL 2,338,034
POTATO PLANTER
Filed April 17, 1940 8 Sheets-Sheet 5

Inventors:
Cameron H. Gemberling,
Rudolph J. Altgelt,
BY John P. Smith
ATTORNEY.

Inventors:
Cameron H. Gemberling
Rudolph J. Altgelt
BY John P. Smith
ATTORNEY.

Dec. 28, 1943.  C. H. GEMBERLING ET AL  2,338,034
POTATO PLANTER
Filed April 17, 1940   8 Sheets-Sheet 7

Inventors:
Cameron H. Gemberling
Rudolph J. Altgelt
BY John P. Smith
ATTORNEY.

Patented Dec. 28, 1943

2,338,034

UNITED STATES PATENT OFFICE 2,338,034

POTATO PLANTER

Cameron H. Gemberling and Rudolph J. Altgelt, South Bend, Ind., assignors to Oliver Farm Equipment Company, a corporation of Delaware Application April 17, 1940, Serial No. 330,042

8 Claims. (Cl. 111—61)

The present invention relates generally to potato planters, but more particularly to a novel and improved construction of potato planter in which uniformity of planting depth, accuracy of intervals between seeds and uniformity of covering is procured.

Another object of the invention is to provide a novel and improved potato planter construction in which the earth working parts such as, first, the fertilizing openers; second, the seed runners; third, the coverers are all connected to the frame structure of the planter so that they may independently raise or fall during the planting operation without effecting the working operation of the other parts while being drawn over rough or uneven ground or when encountering stones and gravel.

A further object of the invention is to provide a novel and improved potato planter having a fertilizer attachment connected therewith in which the three earth working tools may raise and fall independently or may be adjusted independently of each other, or may all be simultaneously raised or lowered by the manipulation of a single manually operable lever.

A still further object of the invention is to provide a novel and improved construction of potato planter in which the runner or seed opener is suspended from the main frame by a parallel link mechanism permitting it to independently rise and fall with respect to the frame and having means associated therewith to effect an adjustment of the depth penetration of the runner.

A still further object of the invention is to provide a novel and improved potato planter in which the fertilizer disc openers are suspended on push bars having their rear ends pivoted to the frame structure in such a manner that the bearings of the discs are positioned below the pivot of the push bars so as to permit the discs to independently roll over stones without disturbing the balance of the machine.

A further object of the invention is to provide a novel and improved construction of potato planter and an associated fertilizing attachment which permits a variety of adjustments so that the fertilizer may be deposited deeper or shallower than the seed if desired.

A still further object of the invention is to provide a novel and improved construction of a potato planter having a fertilizer attachment associated therewith and in which these mechanisms are so operatively associated and arranged in close proximity to one another so as to insure correct and accurate spacing of the fertilizer with respect to the seed, even when the machine is operating on a hillside.

A further object of the invention is to provide a novel and improved construction of potato planter in which the fertilizer container is pivotally mounted on the frame so that the same can be tilted for removing the fertilizer therefrom without disconnecting the driving mechanism.

Another object of the invention is to provide a novel and improved construction of fertilizer attachment for potato planter or the like in which means are provided for depositing fertilizer in two equal strands, one on each side of the seed and in which adjustment is provided so as to permit the fertilizer to be deposited so that amounts ranging from one hundred pounds to three thousand pounds per acre may be uniformly distributed in accordance with the desire of the operator.

Another object of the invention is to provide a novel and improved fertilizer attachment for a potato planter or the like having means associated therewith for properly pulverizing the fertilizing material; means for preventing bridging of the material and means for properly feeding the fertilizer to the pulverizing and feeding mechanism.

Another object of the invention is to provide a novel and improved construction of potato planter in which a novel seed housing construction in combination with a novel form of picker wheel not only insures the approximation of one hundred percent planting of seeds in each hill, but also prevents the possibility of depositing more than one seed in each hill.

A further object of the invention is to provide a novel and improved potato planter having an adjustable floor section in the seed housing so that a variety of sizes of seeds may be accommodated.

A further object of the invention is to provide a novel and improved construction of potato planter in which a flexible element is positioned adjacent the path of the picker wheels to assist in discharging loose seeds carried over by the picker wheel and thereby prevent the planting of more than one seed at a time.

These and other objects are accomplished by providing a construction and an arrangement of the various parts in the manner hereinafter described and particularly pointed out in the appended claims.

Referring to the drawings.

Main frame and earth working tools

Figure 1:
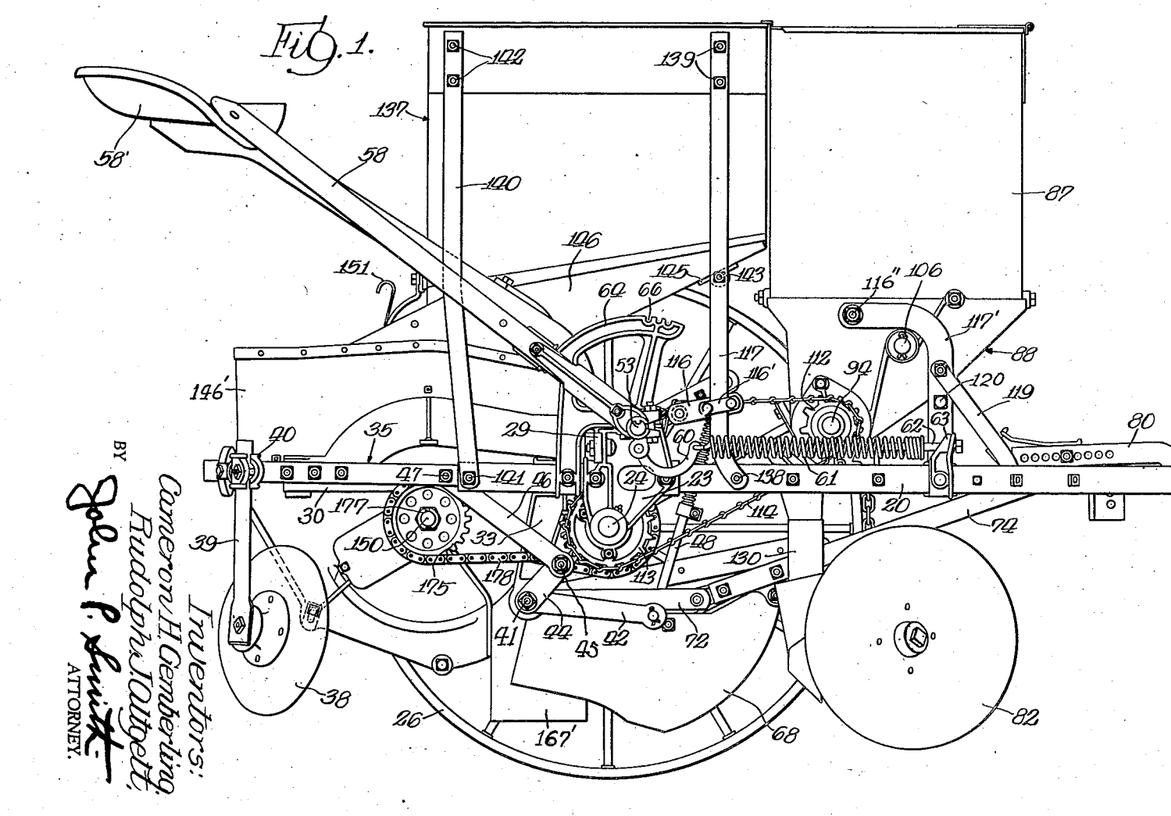
Fig. 1 is a side elevational view of our improved potato planter with one of the carrying wheels removed therefrom.
Figures 2, 10, 11:
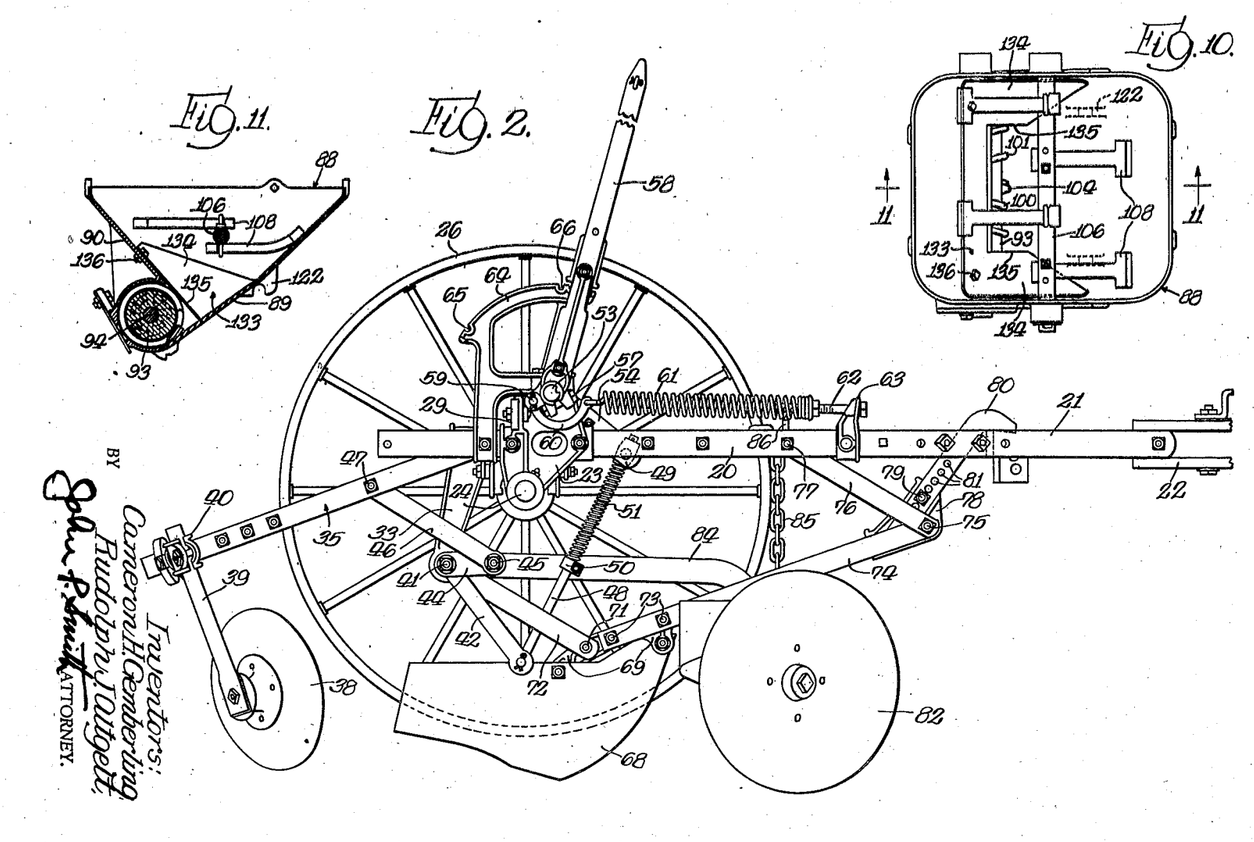
Fig. 2 is a similar side elevational view with certain of the parts removed showing merely the main frame and all of the earth working tools together with the manual lever for operating the same.
Fig. 10 is a top plan view of the fertilizer hopper showing the manner in which a shield may be inserted therein for reducing the amount of material discharged therefrom.
Fig. 11 is a cross sectional view taken on the line 11—11 in Fig. 10.
Figure 3:
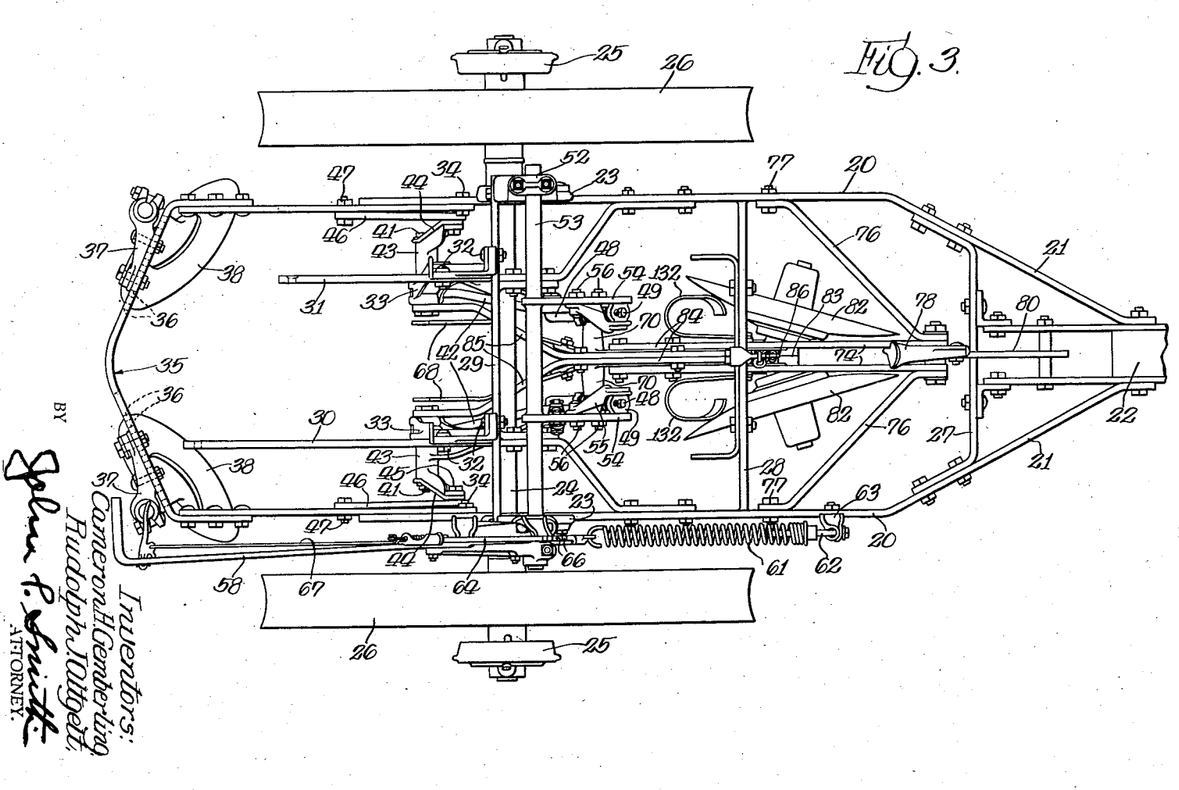
Fig. 3 is a top plan view of the operating parts shown in Fig. 2 of the drawings.

In illustrating one embodiment of our invention, we have shown the same as comprising a main frame in the form of two longitudinally extending main frame members 20 whose forward portions as shown at 21 converge and are secured to a tongue or draft member 22. Secured adjacent the rear ends of the main frame members 20 are suitable bearing brackets 23 in which is journaled a main drive axle 24. Mounted on the opposite ends of the axle 24 for operatively driving the same through the medium of conventional type clutches 25 are carrying or driving wheels 26. The main frame members 20 are provided with forward transverse brace members 27 and 28. (See Fig. 3.) The oppositely disposed bearing brackets 23 and frame members 20 are reinforced by a rear transverse frame member 29. Secured to the longitudinally extending main frame members 20 and offset inwardly towards one another are longitudinally extending and parallel supplemental frame members 30 and 31. Secured to each of the supplemental frame members 30 and 31 and to the transverse brace member 29 by means of bolts 32 are downwardly extending and slightly rearwardly projecting hanger brackets 33. Pivotally connected at the opposite sides as shown at 34 to the rear end of the frame members 20 is a disc coverer frame, generally indicated by the reference character 35. The frame 35 in this instance is substantially U- shaped in construction and is provided with a plurality of apertures as shown at 36 by means of which a pair of disc axle bracket 37 may be adjusted inwardly or outwardly with respect to one another. The brackets 37 are provided with clamping portions 40 in which are adjustably mounted standards 39. Secured to the lower ends of the standards 39 are discs 38. Pivotally mounted as shown at 41 to each of the lower ends of the depending hangers 33 are cranks 42. Formed integrally with each of the cranks 42, through the medium of a hub or bearing 43 is a short crank 44. The free end of each of the cranks 44 is pivotally connected as shown at 45, to the lower ends of each of the links 46. The upper ends of each of the links 46 are connected as shown at 47 to the frame 35. (See Figs. 2 and 3.) The free ends of each of the cranks 42 are pivotally connected to rods 48. The upper ends of these rods 48 are slidably mounted in knuckles 49. Embracing the rods 48 are adjustable clamping collars 50. Mounted between each of the knuckles 49 and adjustable collars 50 is a spring 51 which normally holds the discs 38 yieldingly depressed in earth working position. Journaled in suitable oppositely disposed bearings, generally indicated by the reference character 52 and each of the brackets 23 is a transverse rock shaft 53. Formed integrally with or welded to, at spaced apart positions adjacent the center of the shaft 53, are forwardly extending arms 54. Pivotally mounted adjacent the free ends of each of the arms 54 and by means of the spacer brackets 55 are the knuckles 49 hereinbefore described. These brackets 55 are secured to the arms 54 by means of bolts 56. Secured to one end of the shaft 53 by means of a key and clamping bolt 57 is an operating hand lever 58. Formed integrally with the lever 58 is a rearwardly projecting arm 59. Pivotally secured to the arm 59 is a curved link 60 which has its forward end connected to a balancing spring 61. The forward end of the balancing spring 61 is adjustably connected by a screw mechanism, generally indicated by the reference character 62 to an upwardly extending arm 63, which in turn, is rigidly secured to one of the side frame members 20. Cooperating with the manually operable lever 58 and secured to the side frame member 20 is a lever sector 64 having a locking notch 65 at its rear end and a plurality of locking notches 66 at its forward end. The lever 58 is provided with the usual detent mechanism, generally indicated by the reference character 67, for either locking the lever in its rearmost position as shown in Figs. 1 and 3 of the drawings or in one of a plurality of forward positions as shown in Fig. 2 of the drawings.

From the arrangement thus far described it will be obvious that upon the operation of the manual lever 58 rearwardly the cranks 54 are raised, thereby raising the frame 35 through the medium of connecting rods 48. In other words, the operation of the lever rearwardly raises the frame 35 from the position shown in Fig. 2 to that shown in Fig. 1 of the drawings. It will also be obvious that by the arrangement of having the springs 51 surrounding the rods 48, the discs 38 and frame 35 may yield upwardly independently of the position of the lever when some obstruction of the ground is encountered.

The next important feature of the earth working tools includes the seed opener or runner which may independently yield with respect to the frame or other tools when an obstruction such as a stone is encountered. This mechanism comprises a more or less conventional shaped runner or seed opener, generally indicated by the reference character 68. Secured to the upper forward portion of the opener or shoe 68 is a bracket 69. Formed integrally with and projecting laterally from the bracket 69 are axially aligned hub portions 70 to the outer ends of which are pivoted, as shown at 71, the forward ends of a pair of lower parallel links 72. The rear ends of the links 72 are pivotally supported on a bolt 41 mounted in the lower end of the hanger 33. Secured to the opposite sides of the bracket 69 by means of bolts 73 are upwardly projecting draft bars 74. Pivotally connected, as shown at 75, to the forward ends of the opposite parallel bars 74 are upper parallel links 76. These parallel links diverge rearwardly and have their rearward or upper ends pivoted as shown at 77 to the side frame members 20. Secured to the forward ends of and between the bars 74 is a bracket 78. Adjustably mounted on the bracket 78 by means of a bolt 79 is an adjustable hook or stop 80. The hook 80 is provided with a plurality of apertures in which the bolt 79 may be inserted for adjusting the position of the hook with respect to the bracket. From the above description it will be seen that the forward links 76 and rearward links 72 form in effect a parallel link mechanism for raising and lowering the shoe runner 68 horizontally with respect to the ground. It will also be noted that these parallel links extend forwardly so that when the runner engages the ground, the resistance offered by the ground will cause the runner to penetrate the ground to a point at which the hook will engage the transverse bar or frame member 27 as shown in Fig. 2 of the drawings. The depth penetration of the runner 68 into the ground may also be adjusted by adjusting the hook 80 with respect to the bracket 78 and securing a bolt 79 in any one of a variety of apertures 81 in the hook 80. In this connection it will also be noted that should the runner 68 engage a stone or other obstruction, the parallel link mechanism will permit the runner to swing forwardly and thereby ride over the obstruction. When the operator desires to elevate the shoe, the manipulation of the lever 58 will cause the links or arms 42 to swing upwardly until the lower ends or right angularly bent portions of the rods 48 engage the links 72 and thereby elevate the runner from the position shown in Fig. 2 to that shown in Fig. 1 of the drawings.

Another important feature of the present invention embodies the location, operation and suspension of the disc openers for the fertilizer attachment, in that, these discs are operatively located with respect to the seed opener by operative connections, yet each may be independently raised with respect to the other so that if one or the other encounters some obstructions in the ground it will not effect the position of the other. This novel mechanism comprises two angularly disposed concavo-convex discs 82 mounted on oppositely disposed spindles 83 which are formed integrally or secured together. These spindles 83 are secured to the forward ends of downwardly curved bars 84 which have their rear ends diverging as shown at 85 with their rearmost end portions pivotally connected to the bolts 41 on the lower ends of each of the depending hangers 33. The fertilizer disc openers are suspended for depth penetration adjustment by a chain 85 which has its lower end connected in any suitable manner to the spindles 83 and its upper end adjustably attached to a hook 86 which in turn is secured to the transverse frame member 28. Obviously by shortening or lengthening the chain 85 the depth penetration of the discs 82 may be controlled. In this connection it also will be observed that the rear ends of the push bars 84 are pivoted to the hangers 33 on the bolt 41 which is a point above the bearings of the discs 82. Therefore, the forward motion of the planter has a tendency to force the fertilizer disc openers into the ground. The position of the discs laterally with respect to the seed opener 68 is controlled by the fact that the push bars 84 extend downwardly through the spaced bars 74 of the openers, thereby guiding the discs 82 with respect to the seed opener 68. When an obstruction is met it will be noted that the discs 82 may rise or fall independently of the other earth working tools. The discs 82 are lifted by the operating lever 58 simultaneously with the other tools and by means of the bracket 69 which engages the push bars 84 during the lifting operation of manipulating the lever 58 from the position shown in Fig. 2 to that shown in Fig. 1 of the drawings. In this connection it will also be observed that by having an adjustment whereby the fertilizer disc openers may be adjusted as to depth penetration, the fertilizer material may be deposited deeper or shallower than that of the seed. In other words, with this arrangement, the operator may adjust the seed and the fertilizer with respect to one another in accordance with his wishes.

*Fertilizer attachment*

The fertilizing attachment includes a metal container or hopper, generally indicated by the reference character 87, which is attached to or secured to a container bottom or housing generally indicated by the reference character 88. The housing 88 is provided with forward and rearward converging walls 89 and 90, which terminate in substantially a semi-cylindrical recess 91. (See Figs. 6 to 9, inclusive.) Located in the rear side of the semi-cylindrical recess 91 of the housing 88 is a transverse fertilizer discharge opening 92 which extends substantially throughout the width of the fertilizer bottom or housing. Rotatably mounted in the semi-cylindrical recess 91 is a revolving crushing, conveying and dispensing fertilizer mechanism which includes a wood roller 93 loosely mounted on a shaft 94. One end of the shaft 94 is journaled in a bearing 95 formed integrally with the housing 88. The other end of the shaft is journaled in a bearing 96 formed integrally with a removable plate 97 which, in turn, is secured to a complementary recess 98 in the housing 88 by means of bolts 99. This removable plate permits the roller and shaft to be assembled before it is inserted in the cylindrical recess 91 of the housing 88. Embracing the periphery of the wood roller 93 are oppositely arranged coil springs 100 and 101. The outer ends of each of the springs extend beyond each end of the roller 93 and have their outermost ends extending into apertures 102 and 103 respectively in the shaft 94. Located in the longitudinal center and on the inside inclined wall 89 of the bottom is an upwardly projecting lug 104 which has a forwardly pointed end located in the longitudinal center of the bottom 88. (See Figs. 6 and 7.)

Figure 6:
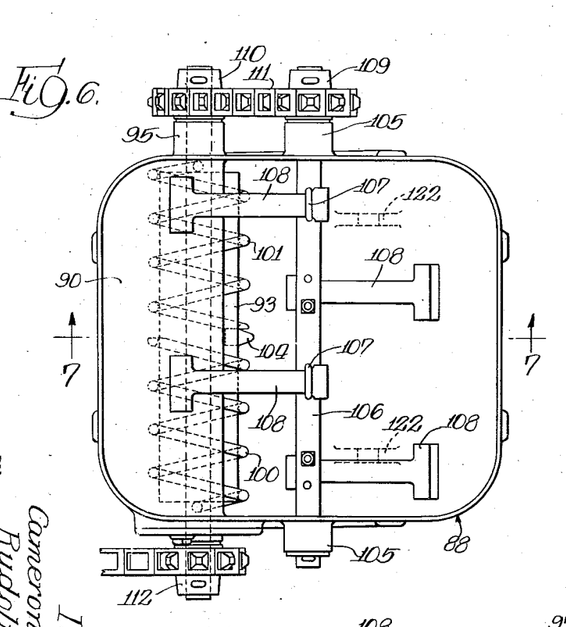
Fig. 6 is a top plan view of the fertilizing mechanism shown in Figs. 4 and 5.
Figure 7:
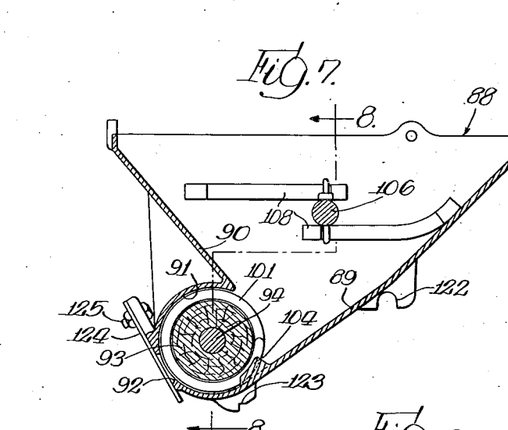
Fig. 7 is a cross sectional view taken on the line 7—7 in Fig. 6.
Figure 8:
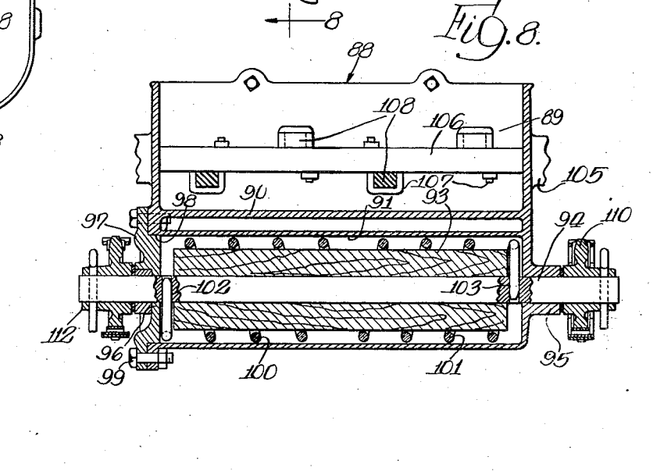
Fig. 8 is a cross sectional view taken on the line 8—8 in Fig. 7.
Figure 9:
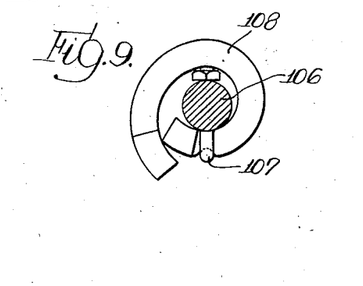
Fig. 9 is an enlarged fragmentary cross sectional view showing the manner in which the rubber agitators are wound around the shaft when the hopper is filled with fertilizing material.

This lug 104 is adapted to be alternately engaged by the opposite springs 100 and 101 upon each complete rotation of the roller 93 and shaft 94, so as to alternately compress the springs 100 and 101. When the ends of the springs pass the lug, they will be abruptly expanded to loosen the fertilizer surrounding the roller between the coils of the springs. This construction prevents clogging and insures uniform feeding of the material. Located in the approximate center of the fertilizer housing 88 and journaled in suitable bearings 105 in the opposite sides thereof, is a rotatable agitator shaft 106. Secured to the opposite sides of the shaft by means of U-shaped bolts 107 and at spaced intervals throughout the length of the shaft, are oppositely arranged substantially T-shaped rubber agitators 108. Obviously with the construction thus far described and illustrated in Figs. 6 to 9 inclusive of the drawings, it will be observed that when the hopper 87 and housing 88 are filled with fertilizing material, the revolving of the shaft will cause the rubber agitators to assume the position shown in Fig. 9, but the moment there is a sufficient reduction in the amount of the fertilizer in the bottom 88, the rubber agitators 108 will become extended as shown in Figs. 6 and 7 of the drawings and prevent a bridging of the material in the bottom proper. These agitators will also perform the function of feeding the material to the crushing and feeding roller and springs 93, 100 and 101, respectively.

Figure 18:
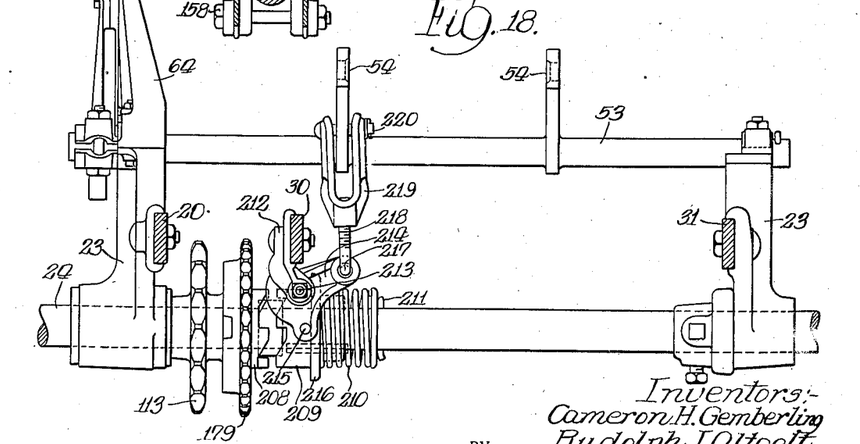
Fig. 18 is a top plan view of the main drive shaft and the operating clutch mechanism.

The shaft 106 is provided with a sprocket wheel 109 which in turn is geared to a sprocket wheel 110 by means of a chain 111. The sprocket wheel 110 is secured to the shaft 94 at one end thereof. Secured to the other end of the shaft 94 is another sprocket wheel 112 which is geared to a drive sprocket 113 by means of a chain 114. The drive sprocket wheel 113 is loosely mounted on the drive axle 24 in a manner which will hereinafter be more fully described. (See Figs. 4 and 18 of the drawings.) One lap of the chain 114 is adapted to travel on an idler roller 115 which is journaled on and adjustably supported by a bracket 116. The bracket 116 is adjustably supported by a vertical supporting frame member 117. (See Figs. 1 and 4.) The fertilizer hopper 87 and bottom 88 are adapted to be swung from the full line position to the broken line position in Fig. 4 of the drawings for removing the fertilizer therefrom. The removal of fertilizer is necessary because commercial fertilizer contains acids which injure metal and often fertilizer when standing has a tendency to cake and forms a cement which locks the bearings of the moving parts. In order to permit the fertilizer bottom and container to be tilted forwardly, the bottom 88 is pivotally attached as shown at 116'' to oppositely positioned and right angularly bent supporting members 117' which have their lower ends secured by bolts 118 to the opposite frame members 29. These members 117' are further reinforced and braced by diagonally disposed straps 119. The container 87 and bottom 88 are normally held in vertical position by a bolt 120 which extends through aligned apertures in opposite supporting members 117' and through a spacer pipe or sleeve 121. The rear inclined wall of the housing 88 is provided with downwardly projecting semi-circular slotted ears 122 which are adapted to engage the transverse pipe 121 for maintaining the bottom 88 and container 87 in its vertical position. (See Figs. 4, 5, 6 and 7.) The rear portion of the bottom 88 is also provided with centrally located notched ear 123 which is adapted to contact and rest upon the transverse frame member 28 for supporting a fertilizer hopper 87 in vertical position. (See Figs. 4 and 7.)

Figure 4:
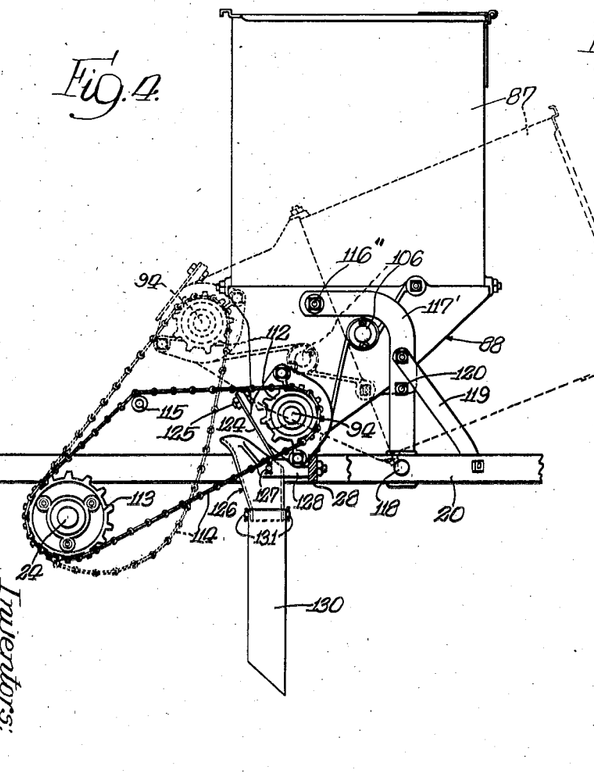
Fig. 4 is a side elevational view of the fertilizing attachment.

It will be obvious from the above description that should the operator desire to tip the hopper and its associated bottom forwardly to the dotted line position shown in Fig. 4 of the drawings, this may be accomplished by merely removing the bolt 120, without disconnecting the power drive or chain 114 from the driving sprocket. It will also be obvious that the fertilizing attachment and particularly the operation of the moving parts thereof, may be rendered inoperative by merely removing the drive chain 114.

Figure 5:
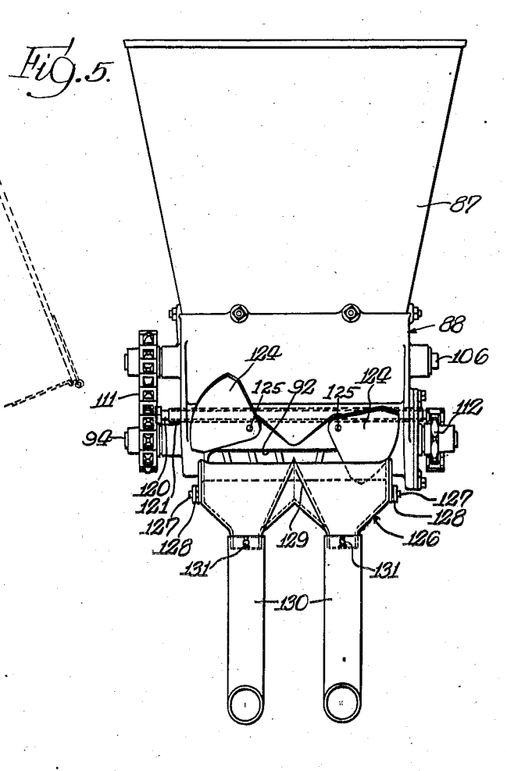
Fig. 5 is a rear elevational view of the same.

In order to control the size of the opening 92 in the bottom 88 of the fertilizer, we have provided two oppositely disposed vanes or shutters 124 which are pivoted on their respective pivots or bolts 125. (See Figs. 4, 5 and 7 of the drawings.) The adjustable shutters 124 as shown in Fig. 5 of the drawings are adjusted at different positions, but under normal operation they should be adjusted to the identical position so that an equal amount of fertilizing material will be discharged on each side of a central line of the longitudinal center of the opening 92 in the hopper bottom. In order to equally divide the ribbon of fertilizer material being discharged through the opening 92 to each of the distributing spouts so as to deposit the same behind the fertilizing discs 82, we have provided a spout or funnel receiving member, generally indicated by the reference character 126. This spout or funnel receiving member 126 is pivotally attached as shown at 127 to oppositely disposed brackets 128, which in turn, are secured to the transverse frame member 28. (See Figs. 4 and 5.) This funnel-like member 126 is positioned below the discharge opening 92 of the bottom 88 so as to receive the fertilizer material therefrom. This member 126 is provided with an upwardly extending inverted V-shaped divider member 129, which performs the function of splitting or equally dividing the ribbon of fertilizer material being discharged into the two separate spouts or funnels. Connected to the spouts or funnels are pipes or conduits 130. The upper end of these conduits are pivotally attached, as shown at 131, to the respective spouts. The lower ends of the tubes 130 extend downwardly into opposite guides 132, which in turn, are attached to the spindle member 83 of the oppositely disposed fertilizer discs 82. (See Fig. 3.)

In order to effectively reduce or comminute the amount of material supposed to be discharged or acted upon by the crushing and discharging roll of the fertilizer mechanism, we have provided a removable shield generally indicated by the reference character 133. The shield 133 is adapted to be placed in the bottom 88, so as to constrict the area of the roller 93 exposed to the fertilizer contained therein. The sides, as shown at 134, are inclined downwardly from the side walls to the bottom, towards and in a direction of the roller so as to cover the end portion of the roller as shown at 135. With this arrangement, together with the adjustable shutters 124, the amount of the fertilizer discharged per acre may be controlled from one hundred, to four hundred pounds per acre. This shield 133 is preferably secured in place by a bolt 136. (See Figs. 10 and 11 of the drawings.)

Potato planting mechanism

The seed planting mechanism in this instance comprises a metallic seed hopper, generally indicated by the reference character 137, which is supported on the main frame of the potato planter by oppositely disposed vertical supporting bars 117. The bars 117 have their lower ends secured to the main frame members 20 as shown at 138 and their upper ends secured to the hopper by means of bolts 139. The rear portion of the hopper is supported by similar laterally spaced apart supports 140 which have their lower ends secured by means of bolts 141 to the opposite frame members 20, and their upper ends secured to the hopper by means of bolts 142. Pivotally mounted on the bolt 143 and a spacer tubing or pipe 144 by means of spaced apart brackets 145 is a rearwardly inclined channel-like shaker bottom 146. The opposite ends of the bolt 143 are pivotally mounted in the forward vertical supports 117. (See Figs. 1, 12 and 13.) Secured to the underside of the shaker bottom 146 is a rearwardly extending and downwardly bent arm 147 which is provided with a roller 148. The roller 148 lies in the path of and rests upon the irregular periphery of a shaker wheel 149. The shaker wheel 149 is rigidly secured to a picker wheel shaft 150. The amount of potato seeds conveyed down the shaker trough 146 is controlled by an adjustable baffle or plate 151 which is held in adjusted position by a spring and bolt mechanism generally indicated by the reference character 152, which in turn is mounted in a bracket 153. The bracket 153 is secured to the rear wall of the housing 137 by a bolt 154.

Figure 12:
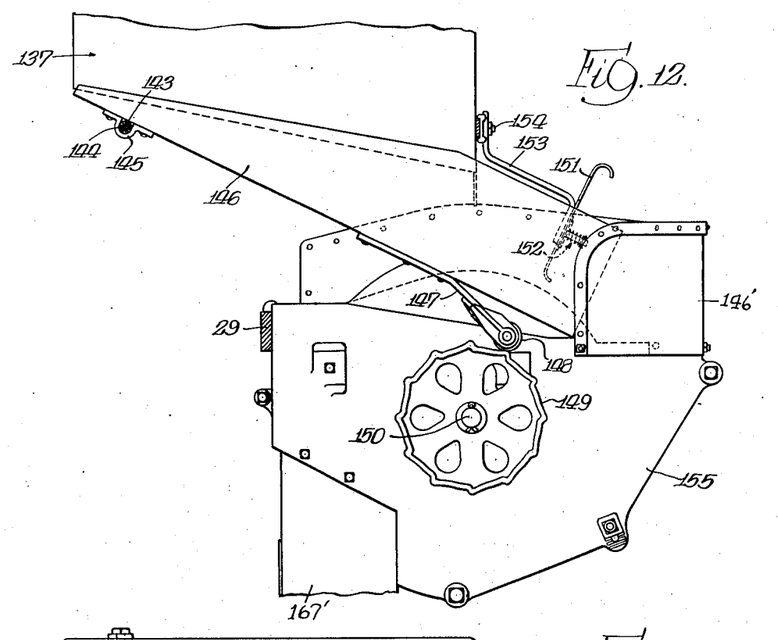
Fig. 12 is a fragmentary side elevational view of the seed shaker and picker wheel housing.
Figure 13:
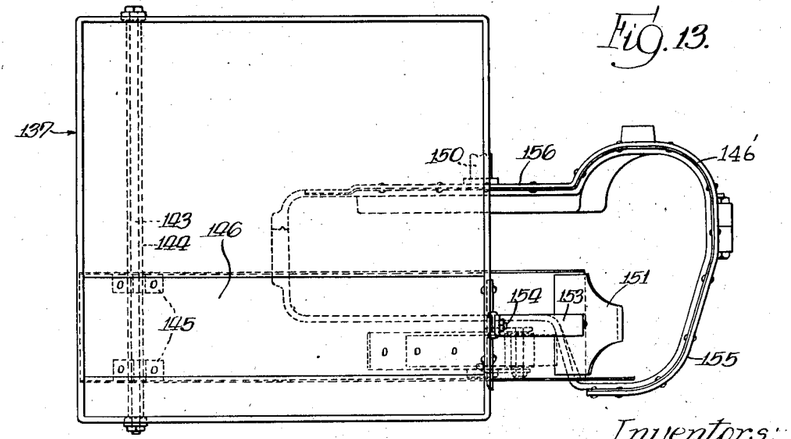
Fig. 13 is a top plan view of the same.
Figure 14:
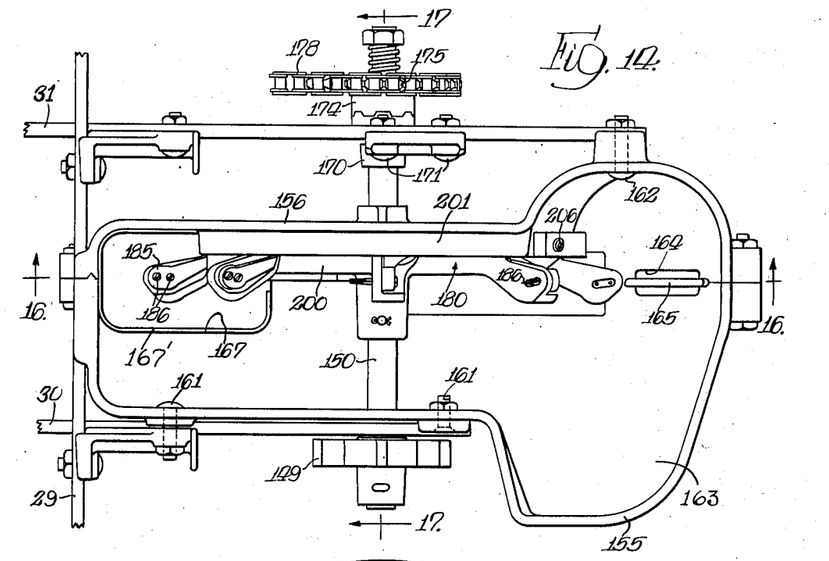
Fig. 14 is an enlarged detailed top plan view of the seed housing and picker wheel.
Figures 15, 17:
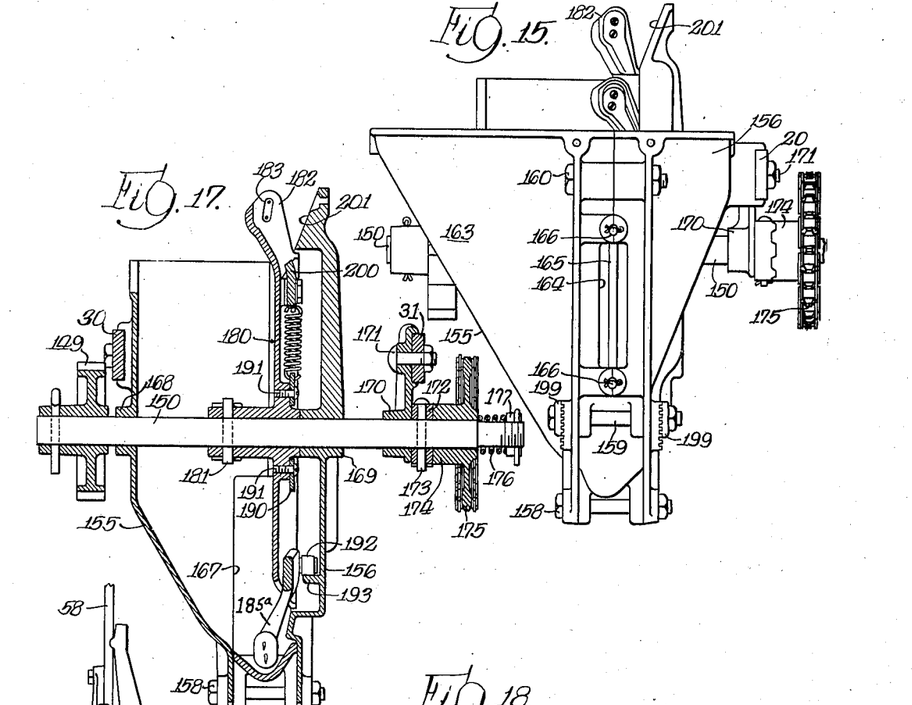
Fig. 15 is a rear elevational view of the housing and picker wheel shown in Fig. 14.
Fig. 17 is a cross sectional view taken on the line 17—17 in Fig. 14.

Obviously from the above description upon the rotation of the shaker wheel 149, the shaker trough 146 will be vibrated about its pivot on the bolt 143 to discharge the potato seeds down the chute into the potato housing adjacent the picker wheel mechanism hereinafter described. Surrounding the discharge end of the chute 146 is a shield 146'. Of course, it will be obvious that the amount discharged down the chute may be readily controlled by adjusting the baffle or gate 151.

Positioned adjacent to and below the discharge end of the shaker chute 146 is a picker wheel housing or casting which comprises two members or castings 155 and 156. These castings 155 and 156 are bolted together by bolts 157, 158, 159 and 160. The housing is bolted to the opposite main frame member 30 by means of bolts 161 and 162. (See Figs. 14, 15, 16 and 17.) The forward end of the picker wheel housing is enlarged so as to form in effect a potato seed well which includes an inclined wall 163 upon which the potato seed is dropped from the discharge end of the shaker chute 146. In order to provide an outlet for the discharge of small particles of soil and leaves from the housing, we have provided an upwardly extending elongated slot 164 at a point located along the contacting surfaces of the castings 155 and 156. This opening or slot 164 is provided with a longitudinally extending rod 165 which has its opposite ends bent at right angles and inserted in complementary apertures as shown at 166. The purpose of this rod is to prevent small seed potatoes from being discharged through the opening. Located in the bottom of the forward end of the picker wheel housing is a relatively large opening 167, to which is attached a shield or guide 167'. The potato seed is discharged from the picker wheel and deposited in the furrow made by the runner or furrow opener 68 through the opening 167 and shield 167'. The picker shaft 150 is journaled in the opposite bearings 168 and 169 formed in the respective castings 155 and 156. The shaft 150 is also journaled in a supplemental bearing 170, which in turn is secured to one of the main frame members 31 by bolts 171.

One of the important features of the present invention includes the positioning of a slip clutch outside of the picker wheel housing, so that, if for any reason, the picker wheel mechanism is stopped on account of some obstruction, there are no moving parts within the housing to ruin the seed or otherwise disrupt the efficiency of the operating parts of the seed planting mechanism. This slip clutch mechanism comprises a clutch member 172 secured to the shaft 150 by means of a pin 173. One face of the clutch member 172 is provided with clutch teeth which are complementary to the clutch teeth of a hub 174 formed integrally with a driven sprocket wheel 175. The sprocket wheel 175 is loosely journaled on the shaft 150 and the clutch faces of each of the clutch members are held in driving relationship by a compression spring 176, the tension of which may be adjusted by means of a horn nut 177 mounted in threaded engagement with one end of the shaft 150. The picker wheel shaft 150, the sprocket wheel 175 is operatively driven by a chain 178 which is trained about a drive sprocket wheel 179. The sprocket wheel 179 is loosely mounted on the axle 24 and formed integrally with the drive sprocket 113. (See Fig. 18.)

Another very important feature of the present invention embodies a novel construction of picker wheel in which shields or picker strippers are formed integrally with the wheel and located laterally off-set with respect to the main body or disc-like portion of the wheel proper. The picker wheel in this instance, generally indicated by the reference character 180, is secured to the picker shaft 150 by a pin 181. Formed integrally with and projecting beyond the periphery of the picker wheel 180 are shields or picker strippers 182. These picker strippers 182 extend radially with respect to the axis of the wheel and are located laterally to one side of the disc portion of the picker wheel, so as to be more conveniently positioned in the path of the seed in the well of the housing of the picker, as will be hereinafter more fully described. In the present instance we have provided eight equally spaced apart picker strippers or shields 182 which are provided with substantially radially disposed slots 183. Pivoted on the picker wheel 180 adjacent each of the picker shields 182 and on shoulder bolts or rivets 184 are picker arms 185. Secured to the outer free ends of each of the picker arms 185, and adapted to be actuated through each of the slotted openings 183 of the respective shields 182, are two picker points or nails 186. The picker arms are normally actuated about their pivots on the bolts or rivets 184 by means of radially disposed springs 187 which have their outer ends connected as shown at 188 to the picker arms 185 and their inner ends connected as shown at 189 to apertures in a disc 190. The disc 190 is secured adjacent the hub of the picker wheel 180 by means of screws 191. Journaled on one side of each of the picker arms 185 is a roller 192. These rollers 192 are adapted to travel in the path of and be engaged by a cam or track 193. This cam or track 193 is formed integrally with the casting or housing section 156 and extends from a point about the opening 167 in the housing to a point adjacent the upward stroke of the picker arm carried by the picker wheel. Formed as a continuation or extension of the track or cam 193 is a removable section 194 which lies tangent to the circular track or cam and is removably secured by means of bolts 195. This track section or cam is made removable because it is subject to considerable wear inasmuch as it is this portion of the cam which engages the rollers to withdraw the nails or picks from the seeds in the operation of discharging the seeds from the picker wheel.

Figure 16:
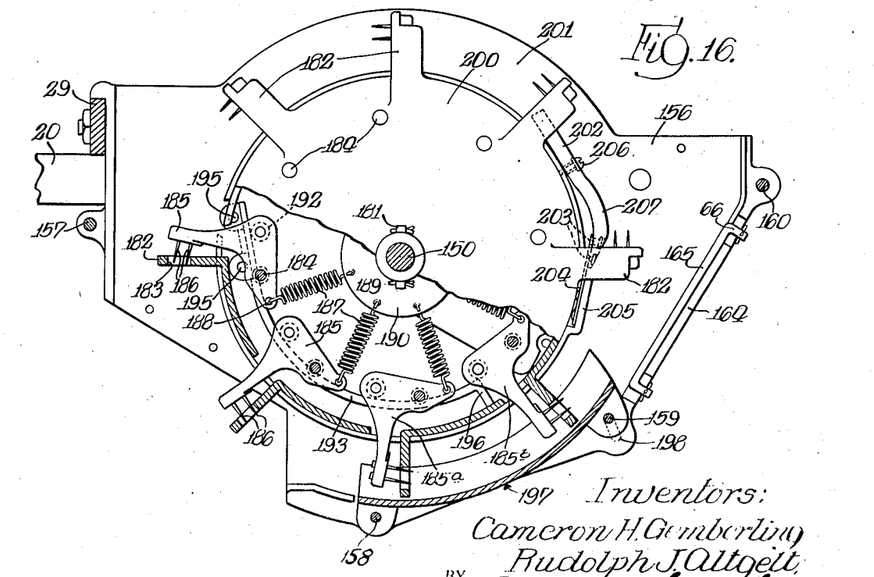
Fig. 16 is a cross sectional view taken on the line 16—16 in Fig. 14.

From the above description it will be obvious from an examination of Fig. 16 of the drawings, that as the seeds lie in the well or the lowermost portion of the picker wheel housing, the picker arm indicated by the reference character 185a has its prongs or pickers 186 withdrawn from the adjacent shield or stripper 182, but that as the picker indicated by 185b reaches a point where the roller 192 has about reached the end of the track as shown at 196, the prongs or picker nails 186, will be actuated by the action of the spring 187, through the slot or opening 183 to pierce or engage the seed at this point, from where it will be carried around and discharged in a manner hereinafter more fully described.

In order to accommodate seeds of different sizes we have provided an adjustable floor or housing section indicated by the reference character 197 which is pivoted on a bolt 158 carried by the housing. The section 197 may be adjusted inwardly or outwardly through the medium of a securing bolt 159 mounted in a slot 198 in the housing. Corrugated washers 199 are employed to engage corresponding or complementary corrugations in the castings 155 and 156 to accomplish this adjustment as clearly shown in Fig. 15 of the drawings.

Another very important feature of the invention includes an abrupt bevelled periphery 200 formed on the picker wheel 180 between each of the radial arms or shields 182. The bevelled portion 200 of the picker wheel is continued upwardly, as shown at 201, on the housing member 156, so as to insure that any excess seed carried over by the picker wheel will be immediately returned to the well of the picking housing.

As further aid to prevent the carrying over of additional seed other than that carried by the picker prongs 186, we have provided a rubber brush 202 which has its lower end tapered and fastened by means of rivets 203 to a metal strip 204. The metal strip in turn, is fastened to a flange 205 formed integrally with the casting 156 adjacent the periphery of the picker wheel 180. The upper end of the brush 202 is held in place by a screw 206, which in turn, is mounted in threaded engagement with the casting or housing member 156, in such a way, that the brush curves outwardly and away from the casting, as shown at 207, below the screw. It will be obvious that the brush 202 is placed in close proximity to the side of the shield or strippers 182 on the picker wheel 180 so that the same ejects any loose seed which is accidentally carried by the rim of the picker wheel. The excess so ejected will be discharged into the well of the housing where it may be subsequently picked up by the prongs 186 of another picker arm. With our novel construction of the picker wheel in combination with the abrupt inclined surface of the cooperating housing and rubber brush ejector, no excess seed will be carried over by the picker wheel and no seed except that carried by the picker prongs will be carried over the upper half of the revolving wheel.

Cooperating with the manually controlled lever 58 for raising and lowering the earth working tools 38, 66 and 82, we have also provided a clutch control mechanism for disconnecting the power from the operative parts of the fertilizing distributing mechanism and the seed planting mechanism, when the earth working tools are raised to elevated or inoperative position. This mechanism includes a clutch member or face 208 formed integrally with the sprocket wheels 113 and 179. (See Fig. 18.) Splined or keyed to the shaft or axle 24 is a complementary clutch member 209 which is normally pressed into engagement with the clutch member 208 by a spring 210. The spring 210 is held in position under pressure by a cotter pin 211 extending through an aperture in the shaft 24. Secured to one of the supplemental frame members 30 is a bracket 212. Pivoted at 213 to the bracket 212 is a clutch fork 214, which in turn, is provided with oppositely disposed lugs 215. These lugs are adapted to engage a flange 216 formed integrally with the clutch member 209 for actuating the splined clutch member into and out of the engagement with the complementary clutch member 208. The fork member 214 is pivotally connected, as shown at 217, by a rod 218, which in turn, has its upper end mounted in threaded engagement with a fork-like member 219. The upper end of the fork-like member 219 is pivotally connected by means of a pin 220 to one of the crank arms 54 of the rock shaft 53. It will be obvious that upon the manipulation of the lever 58 to raise the earth working tools from their ground or operative position, shown in Fig. 2, to the position shown in Fig. 1, the rock shaft 53 will revolve to actuate the clutch fork 214 to disengage the clutch members 208 and 209. The disengagement of these clutch members disconnects the power from the operative driven mechanism of the planting and fertilizing distributors. The chain tightener or idle roller 115 may be adjusted for increasing the tension on the belt 114 by means of a transverse strap 116' which clamps the bracket 116 to the vertical post 117. The potato planter in the present instance is provided with the usual operator's seat 58' within easy reach of the manual lever 58.

Summarizing the advantages and function of the operation of our improved potato planter, it will be readily seen that we have provided a novel construction of picker wheel in combination with a cooperating and novel construction of picker wheel housing which not only insures an efficiency in operation of the planting unit, but also assures the depositing or planting of one seed at a time.

In cooperation with the planting mechanism, it will be obvious that the fertilizer attachment herein described not only permits accuracy in the number of pounds per acre of fertilizer to be deposited, but also permits adjustments whereby the amount of fertilizer deposited may range from one hundred, to three thousand pounds per acre in accordance with the requirements of the operator. As hereinbefore pointed out, the novel crushing and conveying roller insures a breaking up of caked fertilizer and affords a very efficient structure which may readily adapt itself to a variety of other planting mechanisms or machines other than potato planters.

As hereinbefore pointed out, our novel construction and operation of earth working tools, not only permits the raising of the fertilizing discs, the seed opener and covering discs independently of each other, when an obstruction is encountered in the ground, but also provides a single manual control lever for simultaneously raising all earth working tools from ground engaging position to inoperative position. In this connection it will also be noted that means are provided for disconnecting the power or drive of the main axle from the planting and fertilizing mechanisms simultaneously with the raising of the earth working tools out of the ground.

While in the above specification we have described one embodiment which our invention may assume in practice, it will of course, be understood that the same is capable of modification and that modification may be made without departing from the spirit and scope of the invention as expressed in the following claims.

What we claim is our invention and desire to secure by Letters Patent:

1. A planter comprising a frame, earth working tools carried by said frame including a fertilizer opener, a seed opener and a coverer, links for connecting said tools to said frame, means for adjusting the depth penetration of said tools separately, the links of said fertilizer opener engageable with the links of said seed opener for guiding the former with respect to the latter and a single operable lever for simultaneously raising or lowering all of said tools.

2. A potato planter comprising a frame, an axle mounted on said frame, wheels for supporting said frame, a planting mechanism mounted on said frame, a fertilizing mechanism mounted on said frame, operative driving connections between said axle and said planting and fertilizing mechanism, a clutch mechanism forming a part of said driving connections, earth working tools including a fertilizer opener, a seed opener, and a coverer mounted on said frame, connections for connecting said tools to said frame, certain of said connections engaging certain others thereof for maintaining alignment of certain of said tools with respect to each other, means for separately adjusting said earth working tools, and a single operative lever for raising all of said earth working tools and simultaneously disconnecting said clutch.

3. A potato planter comprising a frame, an axle mounted on said frame, wheels for supporting said frame, a planting mechanism mounted on said frame, a fertilizing mechanism mounted on said frame, operative driving connections between said axle and said planting and fertilizing mechanism, a clutch mechanism forming part of said driving connections, earth working tools including a fertilizer opener, a seed opener and a coverer mounted on said frame, means for separately adjusting the depth penetration of said tools, means for connecting said tools to said frame whereby each of said tools may raise and fall independently of the others, certain of said connections engaging certain others thereof for maintaining alignment of certain of said tools, and manually operable means mounted on said frame for raising all of said tools and simultaneously disconnecting said clutch.

4. A planter comprising a frame, earth working tools carried by said frame including a fertilizer opener, a seed opener, and a coverer, and separate means for connecting each of said tools with said frame whereby each of said tools may rise and fall independently of the other, certain of said means engageable with certain others thereof for guiding said fertilizer opener with respect to said seed opener.

5. A planter comprising a frame, earth working tools carried by said frame, including a fertilizer opener, a seed opener, and a coverer, means connecting each of said tools to said frame whereby each of said tools may be raised and lowered independently of the other, certain of said connecting means engaging certain others thereof for guiding said fertilizer openers with respect to said seed openers, and manually operable means mounted on said frame for simultaneously raising and lowering all of said tools.

6. A planter comprising a frame, earth working tools carried by said frame including a fertilizer opener, a seed opener, and a coverer, means for connecting each of said tools to said frame whereby each of said tools may rise and fall independently of the other, the connections of certain of said tools engageable with the connections of certain others of said tools for guiding one of said tools with respect to the other thereof, means for independently adjusting said tools, and means for collectively adjusting said tools.

7. A planter comprising a frame, a seed furrow opener carried by said frame, a fertilizer opener carried by said frame and adapted to rise and fall independently of said seed furrow opener, two longitudinally extending spaced apart bars for connecting said seed opener with said frame, and a longitudinally extending member connecting said fertilizer opener with said frame and extending between said bars for maintaining said fertilizer opener in proper alignment with said seed furrow opener.

8. A planter comprising a frame, a seed furrow opener carried by said frame, a fertilizer opener carried by said frame and adapted to rise and fall independently of said seed furrow opener, two longitudinally extending spaced apart bars for connecting said seed opener with said frame, and a longitudinally extending member connecting said fertilizer opener with said frame and extending between said bars for guiding said fertilizer opener with respect to said seed furrow opener, and a single manually operable lever mounted on said frame for simultaneously adjusting both of said openers.

RUDOLPH J. ALTGELT.
CAMERON H. GEMBERLING.